(12) United States Patent
Sandor et al.

(10) Patent No.: US 10,765,133 B1
(45) Date of Patent: Sep. 8, 2020

(54) SYSTEMS AND METHODS FOR CUTTING AND COOKING A SUBSTANCE

(71) Applicant: Veritas Food Company LLC, Los Angeles, CA (US)

(72) Inventors: Luis A. Sandor, Los Angeles, CA (US); Victor M. Ayala, Sun Valley, CA (US); Martin R. Sandor, Los Angeles, CA (US)

(73) Assignee: VERITAS FOOD COMPANY LLC, Los Angeles, CA (US)

( * ) Notice: Subject to any disclaimer, the term of this patent is extended or adjusted under 35 U.S.C. 154(b) by 0 days.

(21) Appl. No.: 16/819,610

(22) Filed: Mar. 16, 2020

Related U.S. Application Data

(63) Continuation-in-part of application No. 16/421,385, filed on May 23, 2019.

(51) Int. Cl.
*A23L 13/20* (2016.01)
*A22C 17/12* (2006.01)
(Continued)

(52) U.S. Cl.
CPC .............. *A23L 13/20* (2016.08); *A21B 1/48* (2013.01); *A22C 17/12* (2013.01); *A23L 5/17* (2016.08);
(Continued)

(58) Field of Classification Search
CPC .. A47J 37/045; A47J 37/0611; A47J 37/0857; B26F 5/11; B26F 1/44;
(Continued)

(56) References Cited

U.S. PATENT DOCUMENTS 1,908,727 A 5/1933 Bleam
1,974,602 A 9/1934 Dziedzic
(Continued)

FOREIGN PATENT DOCUMENTS

CN 101352247 1/2009
CN 102366109 3/2012
(Continued)

OTHER PUBLICATIONS

Pork Rind Tortillas, www.theprimitivepalate.com/2015/02/08,pork-rind-tortillas/, Feb. 8, 2015.
(Continued)

*Primary Examiner* — Drew E Becker
(74) *Attorney, Agent, or Firm* — Esplin & Associates, PC

(57) ABSTRACT

Systems and methods for cutting and cooking a substance are disclosed. Exemplary implementations may: convey, via a primary conveying subsystem, a layer of food substance along a conveyance path; cut, via a cutter, the layer of food substance into food pieces; apply, via a primary pressurized fluid outlet, primary pressurized fluid such that the food pieces are released from the cutter; apply, via a secondary pressurized fluid outlet positioned above the primary conveying substrate and pointed toward the primary conveying substrate, secondary pressurized fluid so that the food pieces are held flat to a primary conveying substrate; heat, via a heating mechanism, air within a chamber to provide an environment suitable for dehydrating the food pieces passing through the chamber; and convey the food pieces for at least a portion of the conveyance path through the chamber and hold the food pieces flat with a secondary conveying subsystem.

14 Claims, 6 Drawing Sheets

(51) Int. Cl.
*A23L 5/10* (2016.01)
*A47J 37/04* (2006.01)
*B26D 7/06* (2006.01)
*B26D 7/18* (2006.01)
*B26D 7/01* (2006.01)
*A21B 1/48* (2006.01)

(52) U.S. Cl.
CPC ............ *A47J 37/045* (2013.01); *B26D 7/018* (2013.01); *B26D 7/0625* (2013.01); *B26D 7/1854* (2013.01); *B26D 7/1863* (2013.01); *B26D 2210/02* (2013.01)

(58) Field of Classification Search
CPC .... A23L 5/11–5/19; A23L 13/20; A21B 3/07; A21B 1/48; A21B 7/00; A21C 5/003; A21C 11/004–11/08; A21D 17/0006–17/0033; A21D 8/06; B26D 7/0625; B26D 7/1845–7/1863; B26D 7/05; B26D 7/018; B26D 1/12; B26D 2210/02; B26D 207/0018; A22C 17/12; A22C 17/0006–17/0033
USPC ....... 426/523, 512–518, 502–503; 99/443 C, 99/404–406, 386–387
See application file for complete search history.

(56) References Cited

U.S. PATENT DOCUMENTS

| | | | |
|---|---|---|---|
| 2,155,730 A | 4/1939 | Miller | |
| 2,562,850 A | 7/1951 | Winslow | |
| 3,133,574 A | 5/1964 | Reichel | |
| 3,354,920 A | 11/1967 | Hertwig | |
| 3,429,713 A * | 2/1969 | Nelson | A47J 37/044 426/243 |
| 3,468,356 A | 9/1969 | Brauns | |
| 3,576,647 A | 4/1971 | Liepa | |
| 3,677,171 A * | 7/1972 | Le Van | A47J 37/044 99/339 |
| 3,685,561 A | 8/1972 | Beasley | |
| 3,750,507 A * | 8/1973 | Gerber | A41H 43/0292 83/169 |
| 3,873,755 A * | 3/1975 | McKay | A22C 17/00 426/523 |
| 3,877,334 A * | 4/1975 | Gerber | B26D 7/018 83/22 |
| 3,910,141 A | 10/1975 | Divan | |
| 3,911,805 A | 10/1975 | Baird | |
| 3,922,377 A | 11/1975 | Whittle | |
| 4,192,899 A | 3/1980 | Roth | |
| 4,208,441 A | 6/1980 | Westover | |
| 4,234,612 A | 11/1980 | Sakakibara | |
| 4,270,486 A | 6/1981 | Leverenz | |
| 4,276,800 A | 7/1981 | Koppa | |
| 4,357,862 A | 11/1982 | Anstett | |
| 4,361,227 A | 11/1982 | Paulucci | |
| 4,441,003 A | 4/1984 | Eves, II | |
| 5,037,350 A | 8/1991 | Richardson | |
| 5,356,645 A | 10/1994 | Del Villar | |
| 5,802,959 A | 9/1998 | Benson | |
| 5,827,561 A | 10/1998 | Duve | |
| 5,836,224 A * | 11/1998 | Gerber | B26D 7/018 83/22 |
| 6,146,678 A * | 11/2000 | Caridis | A21B 1/245 426/510 |
| 6,659,856 B2 | 12/2003 | Long | |
| 7,022,007 B2 | 4/2006 | Naehring | |
| 7,207,263 B2 | 4/2007 | Henson | |
| 8,646,383 B1 | 2/2014 | Howard | |
| 8,679,560 B2 | 3/2014 | Juravic | |
| 8,846,124 B2 | 9/2014 | Heinzen | |
| 9,138,781 B1 * | 9/2015 | Strong | A22C 17/12 |
| 2003/0138528 A1 | 7/2003 | Hague | |
| 2003/0221535 A1* | 12/2003 | Kraus | B26F 1/44 83/686 |
| 2004/0211323 A1 | 10/2004 | Heinzen | |
| 2005/0034576 A1* | 2/2005 | Ray | B26D 7/018 83/13 |
| 2005/0048189 A1 | 3/2005 | Lombard | |
| 2005/0069624 A1 | 3/2005 | Liu | |
| 2007/0042095 A1 | 2/2007 | Gagliardi, Jr. | |
| 2010/0112169 A1* | 5/2010 | Gunawardena | A23L 5/13 426/523 |
| 2012/0082770 A1 | 4/2012 | Bilet | |
| 2012/0207879 A1 | 8/2012 | Leising | |
| 2012/0263846 A1 | 10/2012 | Wilson | |
| 2013/0052316 A1 | 2/2013 | Aviles Rodriguez | |
| 2014/0113047 A1 | 4/2014 | Suski | |
| 2018/0027850 A1 | 2/2018 | Sandor | |

FOREIGN PATENT DOCUMENTS

| | | |
|---|---|---|
| CN | 102813219 | 12/2012 |
| CN | 103416772 | 12/2013 |
| EP | 0855139 | 7/1998 |

OTHER PUBLICATIONS

Low Carb Maven, www.lowcarbmaven.com/almost-zero-carb-wraps-tortillas-gluten-free-keto, Jan. 30, 2016.

Automatic derinding machine ESB 4434, https://www.maja.de/en/produkte/?tab=dl&play=3924&id=7944.

Baked Pork Rinds NPL, http://saltysassy.com/recipe/baked-pork-rinds-baked-pork-cracklins/ (Year: 2015).

* cited by examiner

SYSTEMS AND METHODS FOR CUTTING AND COOKING A SUBSTANCE

The present application is a Continuation-in-Part of co-pending U.S. application Ser. No. 16/421,385, filed May 23, 2019.

FIELD OF THE DISCLOSURE

The present disclosure relates to systems and methods for shaping, cutting and cooking a substance.

BACKGROUND

Baked and fried chips, crackers and tostadas are popular snacks that may be paired with many different foods. In particular, fried pork skins and pork rinds provide a low-carbohydrate alternative to chips. However, during the cooking process, a layer of food substance (e.g., pork rinds) may expand in size, twist, and/or puff up. A system that holds the layer of food substance flat during the cooking process does not appear to be known in the art.

SUMMARY

One aspect of the present disclosure relates to a system configured for cutting and cooking a substance. The system may be configured to convey, via a primary conveying subsystem, a layer of food substance along a conveyance path along which the layer of food substance is conveyed. The primary conveying subsystem may include a primary conveying substrate and primary driving components. The primary conveying substrate may form a surface on which the layer of food substance is carried. The primary driving components may move the primary conveying substrate along the conveyance path. A cooker and a secondary conveying subsystem may be positioned along the conveyance path. The cooker may include a heating mechanism and a chamber. The secondary conveying subsystem may include a secondary conveying substrate and secondary driving components. The secondary conveying substrate being positioned adjacent to the primary conveying substrate to contact the layer of food substance on a side of the layer of food substance opposite the primary conveying substrate within the chamber. A cutter may be positioned upstream on the conveyance path from the chamber. The system may be configured to cut, via the cutter, the layer of food substance into food pieces. The system may be configured to apply, via a primary pressurized fluid outlet, primary pressurized fluid. The primary pressurized fluid outlet may be positioned such that primary pressurized fluid exiting the primary pressurized fluid outlet applies a force to the food pieces such that the food pieces are released from the cutter. The system may be configured to apply, via secondary pressurized fluid outlet, secondary pressurized fluid. The second pressurized fluid outlet may be positioned such that pressurized fluid exiting the pressurized fluid outlet applies a force to the food pieces so that the secondary pressurized fluid exiting the secondary pressurized fluid outlet applies force to the food pieces to hold the food pieces flat to the primary conveying substrate. The system may be configured to heat, via the heating mechanism, the chamber. The system may be configured to hold, via the secondary conveying subsystem, the layer of food substance flat between the primary conveying substrate and the secondary conveying substrate for at least a portion of the chamber.

Another aspect of the present disclosure relates to a method for cutting and cooking a substance. The method may include conveying, via a primary conveying subsystem, a layer of food substance along a conveyance path along which the layer of food substance is conveyed. The primary conveying subsystem may include a primary conveying substrate and primary driving components. The primary conveying substrate may form a surface on which the layer of food substance is carried. The primary driving components may move the primary conveying substrate along the conveyance path. A cooker and a secondary conveying subsystem may be positioned along the conveyance path. The cooker may include a heating mechanism and a chamber. The secondary conveying subsystem may include a secondary conveying substrate and secondary driving components. The secondary conveying substrate may be positioned adjacent to the primary conveying substrate to contact the layer of food substance on a side of the layer of food substance opposite the primary conveying substrate within the chamber. A cutter may be positioned upstream on the conveyance path from the chamber. The method may include cutting, via the cutter, the layer of food substance into food pieces. The method may include applying, via a primary pressurized fluid outlet, primary pressurized fluid. The primary pressurized fluid outlet may be positioned such that primary pressurized fluid exiting the primary pressurized fluid outlet applies a force to the food pieces such that the food pieces are released from the cutter. The method may include applying, via secondary pressurized fluid outlet, secondary pressurized fluid. The second pressurized fluid outlet may be positioned such that pressurized fluid exiting the pressurized fluid outlet applies a force to the food pieces so that the secondary pressurized fluid exiting the secondary pressurized fluid outlet applies force to the food pieces to hold the food pieces flat to the primary conveying substrate. The method may include heating, via the heating mechanism, the chamber. The method may include holding, via the secondary conveying subsystem, the layer of food substance flat between the primary conveying substrate and the secondary conveying substrate for at least a portion of the chamber.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
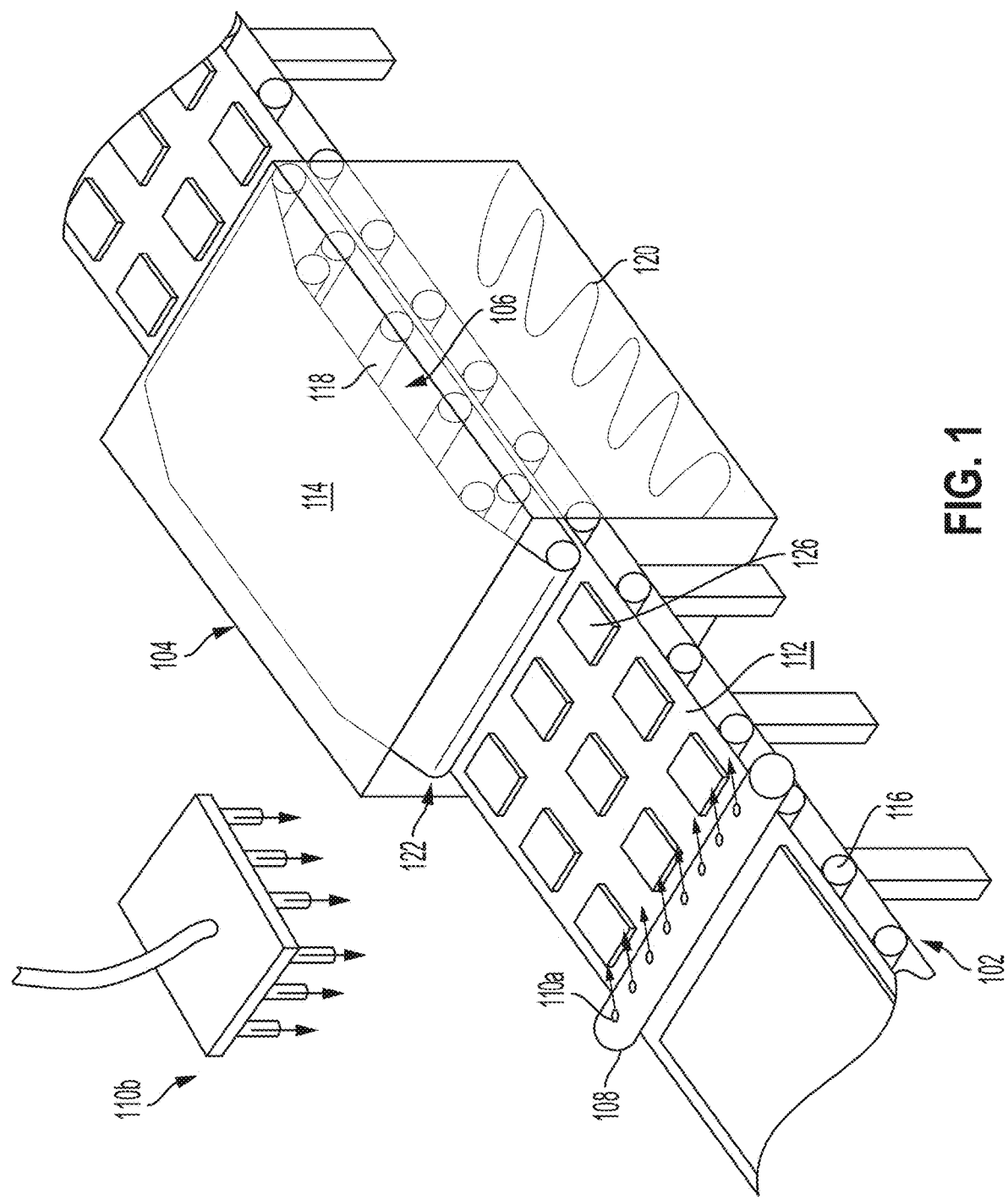
FIG. 1 illustrates a system configured for cutting and cooking a substance, in accordance with one or more implementations.

FIG. 1 illustrates a system 100 configured for cutting and cooking a substance, in accordance with one or more implementations. In some implementations, system 100 may include one or more components. The components may include one or more primary conveying subsystem 102, cooker 104, secondary conveying subsystem 106, cutter 108, primary pressurized fluid outlet 110a, secondary pressurized fluid outlet 110b, primary conveying substrate 112, secondary conveying substrate 114, primary driving components 116, secondary driving components 118, heating mechanism 120, chamber 122, and/or other components.

Primary conveying subsystem 102 may be configured to convey a layer of food substance along a conveyance path along which the layer of food substance is conveyed. The layer of food substance may be a food substance that is intended to be heated, dehydrated, and/or cooked. The layer of food substance may undergo initial preparation. The initial preparation may include measuring ingredients, mixing the ingredients, refrigeration, freezing, slicing, thinning, and/or other preparations. The layer of food substance may include, by way of non-limiting example, protein-based food substances (e.g., raw pork skin, pork skin), and/or other layers of food substance. In some embodiments, the conveyance path may end at a container into which pellets are conveyed. Pellets may be the food pieces that result subsequent to conveyance through cooker 104 (e.g., an oven) such that the food pieces may constitute a different form (e.g., are dehydrated, cooked, partially cooked, etc.). In other embodiments, the conveyance path may end at a container into which food pieces are conveyed. The food pieces may be flat subsequent to conveyance through cooker 104 (e.g., a fryer) such that the food pieces may constitute a different form (e.g., fried). The container may include, by way of non-limiting example, a deep bin, shallow bin, tray, sheet pan, and/or other containers. The conveyance path may be straight, curved, ascend, descend, and/or include other various paths. Primary conveying subsystem 102 may include primary conveying substrate 112 and primary driving components 116. Primary conveying substrate 112 may form a surface on which the layer of food substance is carried. Primary conveying substrate 112 may include a belt conveyor, plastic belt conveyor, lineshaft roller conveyor, chain conveyor, wire mesh conveyor, flexible conveyor, spiral conveyor, and/or other substrates. Primary driving components 116 may move primary conveying substrate 112 along the conveyance path. Primary driving components 116 may include one or more of pulleys, idlers, motors, rails, guide rollers, belting guiding wheels, and/or other primary driving components. Primary driving components 116 may be configured to move primary conveying substrate 112 at one or more predetermined speeds for one or more periods of time and/or lengths of the conveyance path.

Cooker 104 may be configured to heat, dehydrate, and/or cook food substance. Cooker 104 may include heating mechanism 120 and chamber 122. Heating mechanism 120 may be configured to heat chamber 122 to provide an environment suitable for heating, dehydrating, and/or cooking the food substance passing through cooker 104. In some embodiments, heating mechanism 120 may be configured to heat, dehydrate, and/or cook the layer of food substance such that pellets result. Heating mechanism 120 may include fire, electricity through wires (e.g., coil, ribbon, strip(s), etc.), fans (e.g., convection ovens), and/or other heating mechanisms. Cooker 104 may be positioned along the conveyance path. Chamber 122 may occupy a predefined length of the conveyance path based on heating standards. Heating standards may include one or more temperatures heating mechanism 120 is set to (e.g., 350 degrees for two minutes then 300 degrees for three minutes), how long the layer of food substance endures the one or more temperatures, material of conveying substrates, speed of driving components, and/or other heating standards. The conveyance path following exiting chamber 122, conveying the pellets or the food pieces, may continue for a predetermined length and/or time based on cooling standards. Cooling standards may include time to allow the layer of food substance to cool, temperature of environment subsequent to exiting cooker, speed of primary driving components 116, and/or other cooling standards. Heating standards and cooling standards may vary based on the layer of food substance. By way of non-limiting example, the conveyance path in an oven chamber may be longer than a conveyance path in a frying chamber and the conveyance path subsequent to exiting an oven may be shorter than a conveyance path subsequent to exiting a frying chamber.

In some implementations, chamber 122 may be enclosed (e.g., oven) such that heating mechanism 120 heats the interior of chamber 122. In some implementations, chamber 122 may include a reservoir (e.g., fryer, boiler, etc.) such that heating mechanism 120 may be configured to heat fluid (e.g., oil, water, etc.) held within the reservoir. Primary conveying subsystem 102 may descend into the reservoir such that the layer of food substance is partially or completely submerged. Subsequently, primary conveying subsystem 102 may ascend out of the reservoir.

Secondary conveying subsystem 106 may include secondary conveying substrate 114 and secondary driving components 118. Secondary conveying substrate 114 and secondary driving components 118 may be the same as or similar to primary conveying substrate 112 and primary driving components 116, respectively. Secondary conveying substrate 114 may be positioned adjacent to primary conveying substrate 112 to contact the layer of food substance on a side of the layer of food substance opposite primary conveying substrate 112 within chamber 122. Secondary conveying subsystem 106 may be configured to hold the layer of food substance flat between primary conveying substrate 112 and secondary conveying substrate 114 for at least a portion of chamber 122. Secondary driving components 118 may move secondary conveying substrate 114 in accordance with primary conveying substrate 112 along the conveyance path within chamber 122. By holding the layer of food substance flat in between primary conveying substrate 112 and secondary conveying substrate 114, the layer of food substance may maintain a specific thickness and/or shape while being heated, dehydrated, and/or cooked. The specific thickness may be based on the positioned distance of secondary conveying subsystem 106 from primary conveying subsystem 102. Secondary conveying subsystem 106 may be positioned on a portion of the conveyance path just before chamber 122, through a portion of chamber 122, throughout chamber 122, and/or portion of the conveyance path just after chamber 122.

Cutter 108 may be configured to cut the layer of food substance into food pieces 126. Cutter 108 may be positioned upstream on the conveyance path from chamber 122 such that the food substance may be cut into food pieces 126 and subsequently conveyed into chamber 122. Cutter 108 may include blades. Cutter 108 may be a cylindrical shape, rectangular shape, circular shape, and/or other shapes. The blades may be of stainless steel, carbon steel, alloy steel, and/or other materials. The blades may be arranged in a pattern on the exterior of cutter 108. In some implementations, cutter 108 may be cylindrical-shaped. The cylindrical-shaped cutter size may be based on a desired final perimeter of the food pieces subsequent to being heated, dehydrated, and/or cooked, expected shrinkage subsequent to the food pieces exiting chamber 122, expected expansion subsequent to the pellets exiting chamber 122, and/or other factors. Cutter 108 may be held by an axis rod around which the cutter rotates. Cutter 108 may rotate as primary conveying substrate 112 carrying the layer of food substance is conveyed underneath cutter 108. The blades may be arranged in the pattern based on a desired perimeter of food pieces 126 subsequent to conveyance through chamber 122 and the size of cutter 108. Food pieces 126 may be in shapes based on the pattern. The patterns may result in food pieces 126 in the shape of hexagons, semi-hexagons, circles, semi-circles, triangles, ovals, squares, rectangles, and/or other shapes.

Primary pressurized fluid outlet 110a may be configured to apply primary pressurized fluid (illustrated as arrows). The primary pressurized fluid may include gas (e.g., air), water, oil, and/or other fluids. Primary pressurized fluid outlet 110a may be positioned such that pressurized fluid exiting primary pressurized fluid outlet 110a applies a force to food pieces 126 such that food pieces 126 are released from cutter 108. In some implementations, primary pressurized fluid outlet 110a may be angled and positioned immediately above the cutter such that the outlet points toward the conveyance path. In some implementations, primary pressurized fluid outlet 110a may be incorporated into and work simultaneously with cutter 108.

Secondary pressurized fluid outlet 110b may be configured to apply secondary pressurized fluid. The secondary pressurized fluid may include gas (e.g., air), water, oil, and/or other fluids. Secondary pressurized fluid outlet 110b may be positioned above primary conveying substrate 112 and pointed toward primary conveying substrate 112 so that the secondary pressurized fluid exiting secondary pressurized fluid outlet 110b applies force to food pieces 126 to push and therefore hold food pieces 126 flat to primary conveying substrate 112 during conveyance along the conveyance path towards chamber 122. Secondary pressurized fluid outlet 110b may be positioned downstream of cutter 108, i.e., in between cutter 108 and chamber 122 along the conveyance path. In some implementations, there may be more than one secondary pressurized fluid outlet 110b positioned as mentioned above along the conveyance path that is in between cutter 108 and chamber 122.

By way of non-limiting example, raw pork skin pieces may curl and fold due to internal stress prior to being dehydrated and/or cooked. Secondary pressurized fluid outlet 110b and, in some implementations, a suction inlet (not shown in FIG. 1, see suction inlet 124 in FIG. 6 and/or suction inlet 324 in FIG. 3) may hold the raw pork skin pieces flat to primary conveying substrate 112 until conveying into chamber 122 (i.e., cooker 104) for dehydration and/or cooking.

The suction inlet may be configured to pull food pieces to hold the food pieces flat to primary conveying substrate 112 during conveyance along the conveyance path towards chamber 122. The suction inlet may be positioned below primary conveying substrate 112 and pointed upward towards primary conveying substrate 112. The suction inlet may be positioned downstream of cutter 108, i.e., in between cutter 108 and chamber 122 along the conveyance path. By way of non-limiting example, the suction inlet may include a vacuum, tubes, motors, and/or other elements. As previously mentioned, primary conveying substrate 112 may include a belt conveyor, perforated plastic belt conveyor, lineshaft roller conveyor, chain conveyor, wire mesh conveyor, flexible conveyor, spiral conveyor, and/or other substrates where the suction inlet may draw, e.g., air, through and thus pull the food pieces. In some implementations, secondary pressurized fluid outlet 110b and the suction inlet may perform contemporaneously so that the food pieces are held flat to primary conveying substrate 112 until entrance into chamber 122. In some implementations, secondary pressurized fluid outlet 110b and/or the suction inlet may be used at once.

Figure 6:
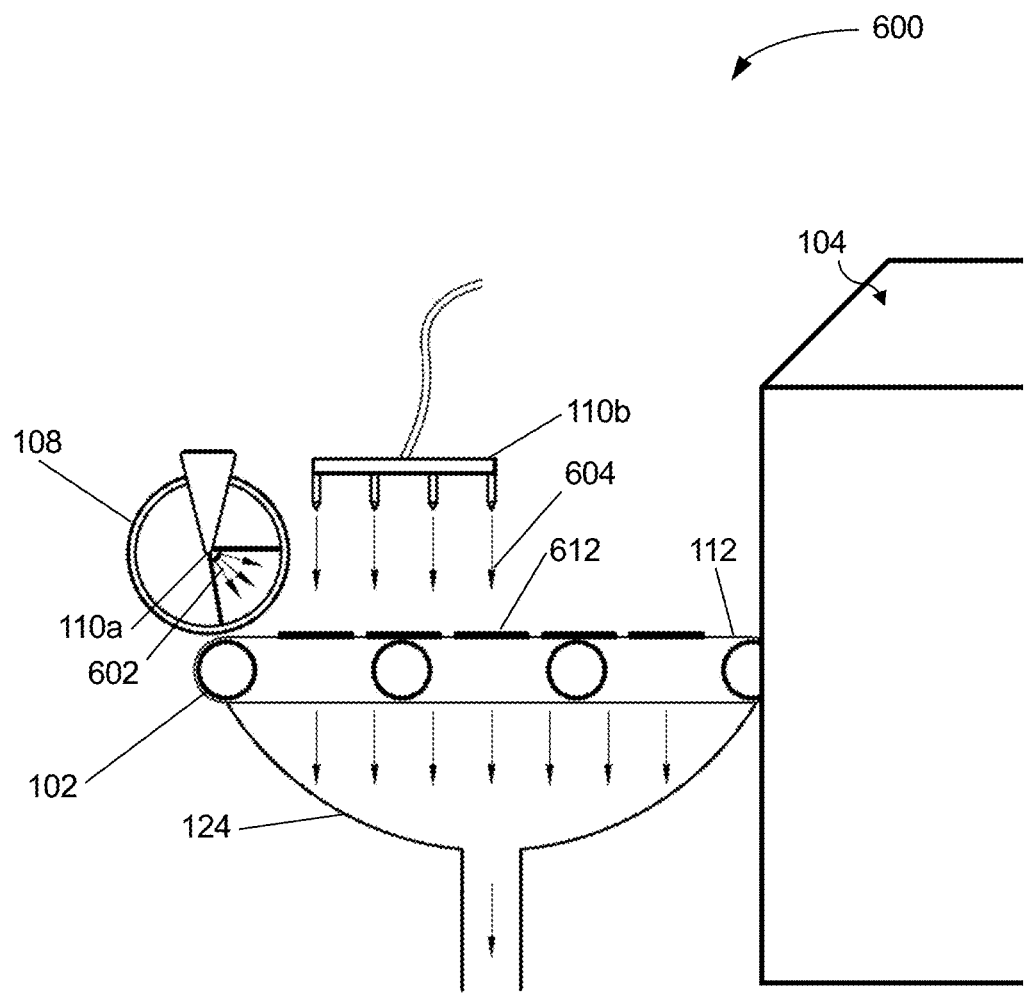
FIG. 6 illustrates an example implementation of a system configured for cutting and cooking a substance, in accordance with one or more implementations.

FIG. 6 illustrates an example implementation of a system configured for cutting and cooking a substance, in accordance with one or more implementations. FIG. 6 illustrates conveyance path portion 600. Along conveyance path portion 600, food pieces 612 may result from cutter 108 cutting a raw pork skin slab. Food pieces 612 may be forced off of cutter 108 by primary pressurized fluid outlet 110a applying primary pressurized fluid (arrows) 602. Subsequently, secondary pressurized fluid outlet 110b may apply pressurized fluid (arrows) 604 to force food pieces 612 flat to primary conveying substrate 112 while primary conveying subsystem 102 conveys food pieces 612 towards cooker 104. Contemporaneously, suction inlet 124 may pull food pieces 612 flat to primary conveying substrate 112 while primary conveying subsystem 102 conveys food pieces 612 towards cooker 104.

Figure 3:
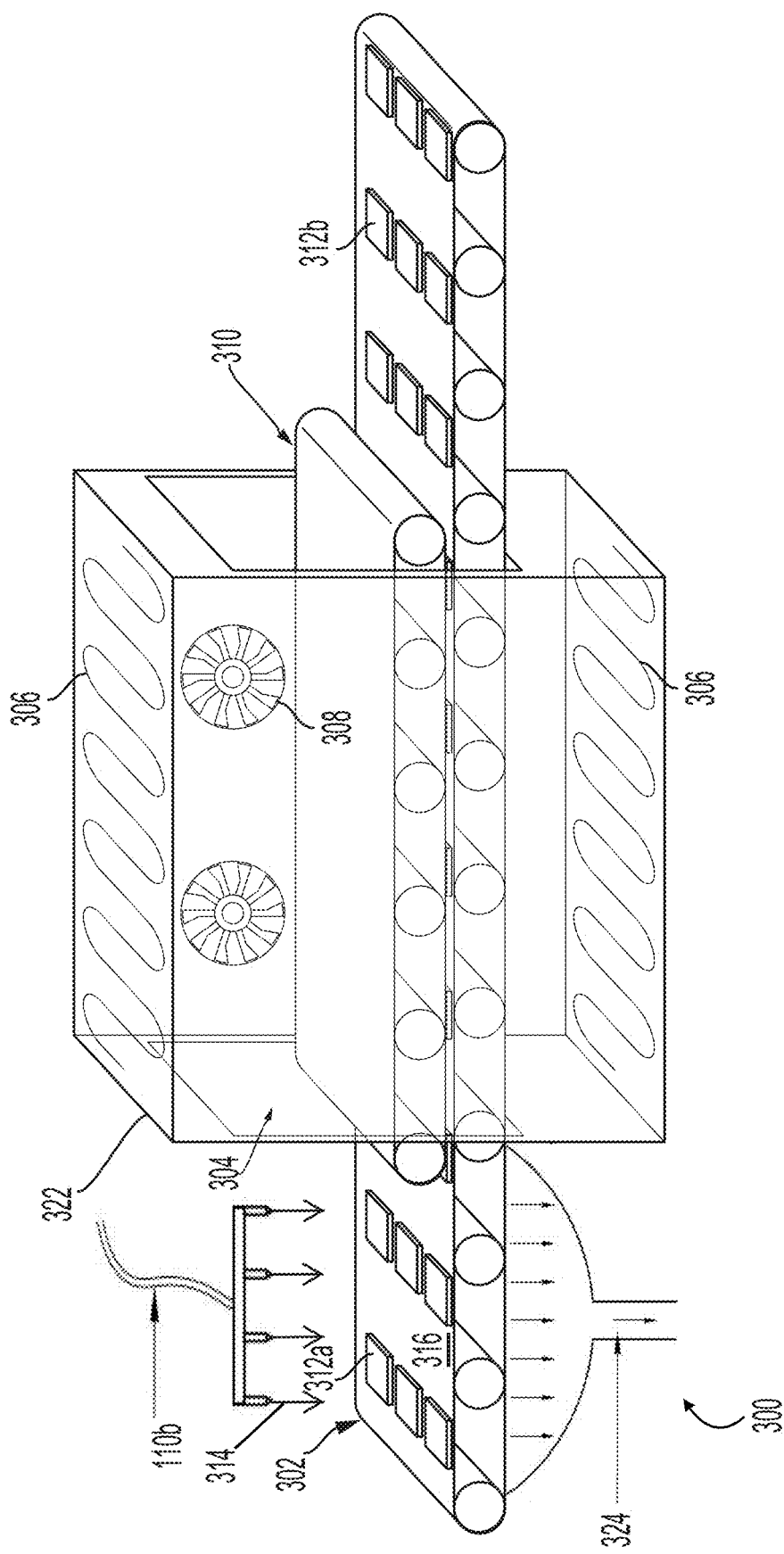
FIG. 3 illustrates an example implementation of a system configured for cutting and cooking a substance, in accordance with one or more implementations.

FIG. 3 illustrates an example implementation of a system configured for cutting and cooking a substance, in accordance with one or more implementations. FIG. 3 illustrates conveyance path portion 300. Conveyance path portion 300 may include primary conveying subsystem 302 conveying food pieces 312a into cooker 322. Cooker 322 may include chamber 304 such that the cooker resembles an oven. Cooker 322 may include heating coils 306 and fans 308 such that chamber 304 is heated similar to a convection oven. Similarly illustrated in FIG. 6, secondary pressurized fluid outlet 110b may apply pressurized fluid (arrows) 314 to force food pieces 312a flat to primary conveying substrate 316 while primary conveying subsystem 302 conveys food pieces 312a towards chamber 304. Contemporaneously, suction inlet 324 may pull food pieces 312a flat to primary conveying substrate 316 while primary conveying subsystem 302 conveys food pieces 312a towards chamber 304. Secondary conveying subsystem 310 may be positioned slightly before food pieces 312a convey into chamber 304 and slightly after food pieces 312a convey out of chamber 304 as pellets 312b. Secondary conveying subsystem 310 may hold food pieces 312a flat while conveying through chamber 304.

Figure 4:
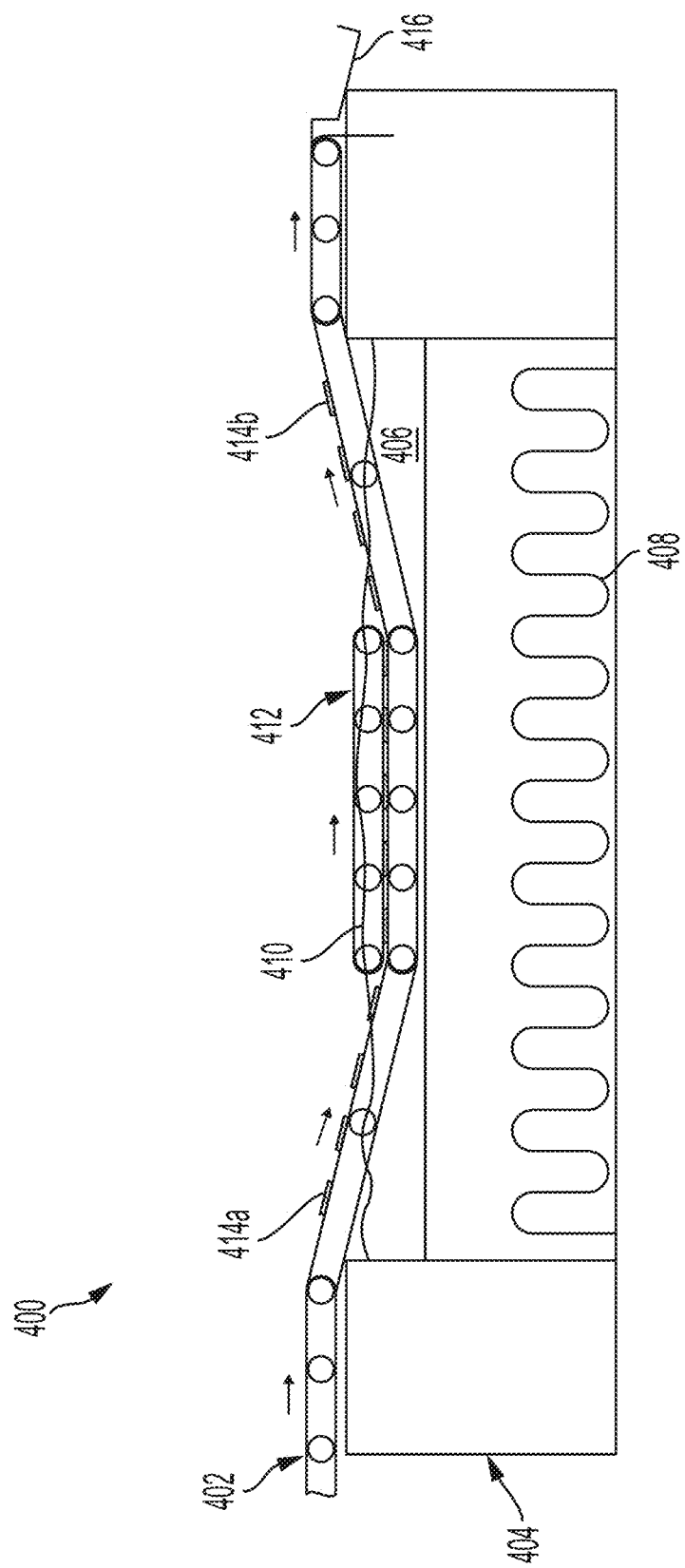
FIG. 4 illustrates an example implementation of a system configured for cutting and cooking a substance, in accordance with one or more implementations.

FIG. 4 illustrates an example implementation of a system configured for cutting and cooking a substance, in accordance with one or more implementations. FIG. 4 illustrates conveyance path portion 400. Conveyance path portion 400 may include primary conveying subsystem 402 conveying food pieces 414a into cooker 404. Cooker 404 may include reservoir 406 and heating coils 408 in which liquid 410 is heated such that food pieces 414a are conveyed into reservoir 406 for cooking (e.g., frying). Secondary conveyance subsystem 412 may be positioned in the center of reservoir 406 such that food pieces 414a are held flat while conveying through the center of reservoir 406 and subsequently result as flat food pieces 414b. Flat food pieces 414b may be conveyed into container 416 subsequent to exiting reservoir 406.

Figure 5:
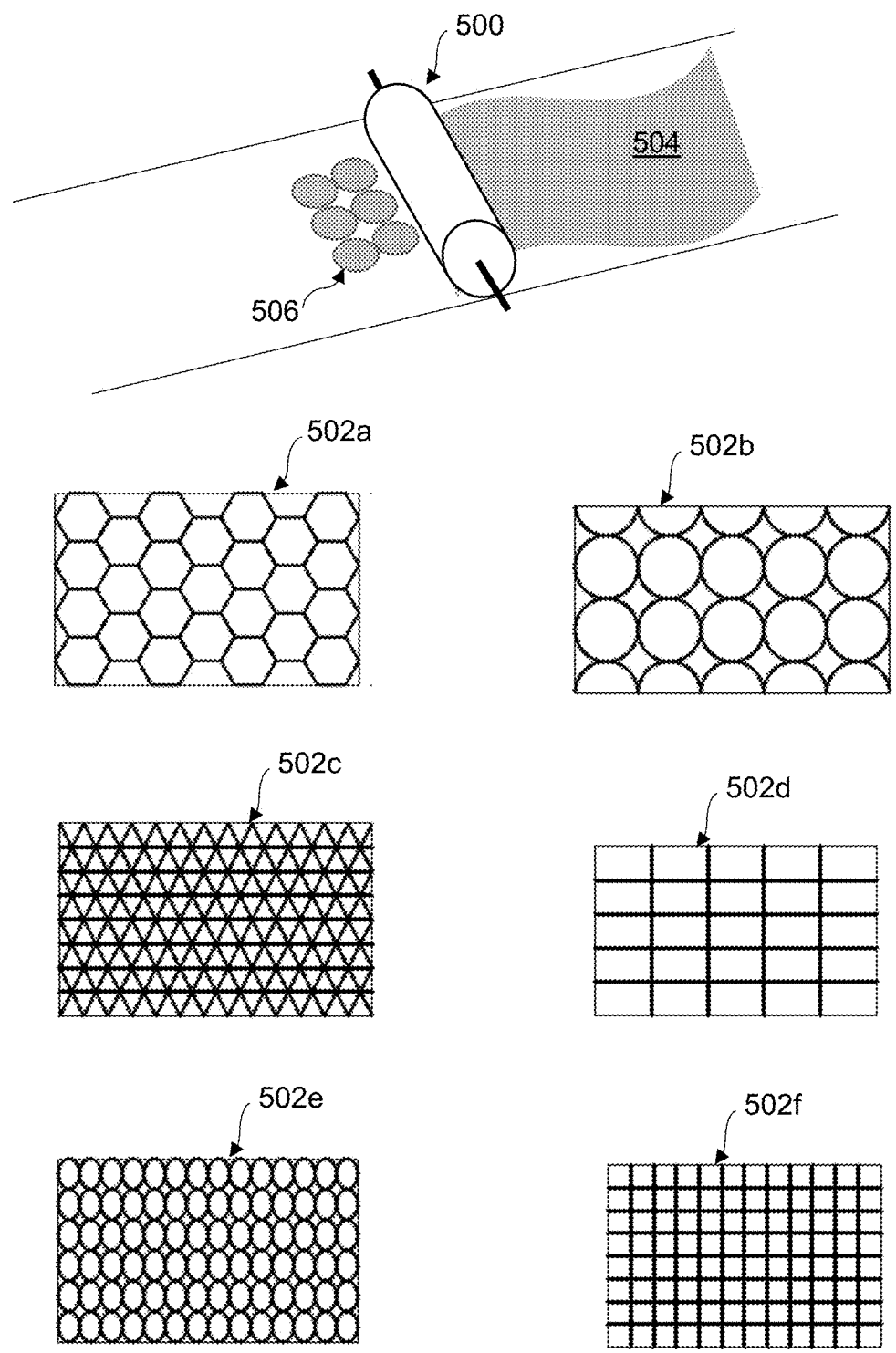
FIG. 5 illustrates an example implementation of a system configured for cutting and cooking a substance, in accordance with one or more implementations.

FIG. 5 illustrates an example implementation of a system configured for cutting and cooking a substance, in accordance with one or more implementations. FIG. 5 illustrates cylindrical cutter 500. Blade patterns 502a-f may be arranged on the exterior of cylindrical cutter 500. Cylindrical cutter 500 may include pattern 502b such that layer of food substance 504 may be cut into food pieces 506 as the layer of food substance 504 conveys under cylindrical cutter 500.

Figure 2:
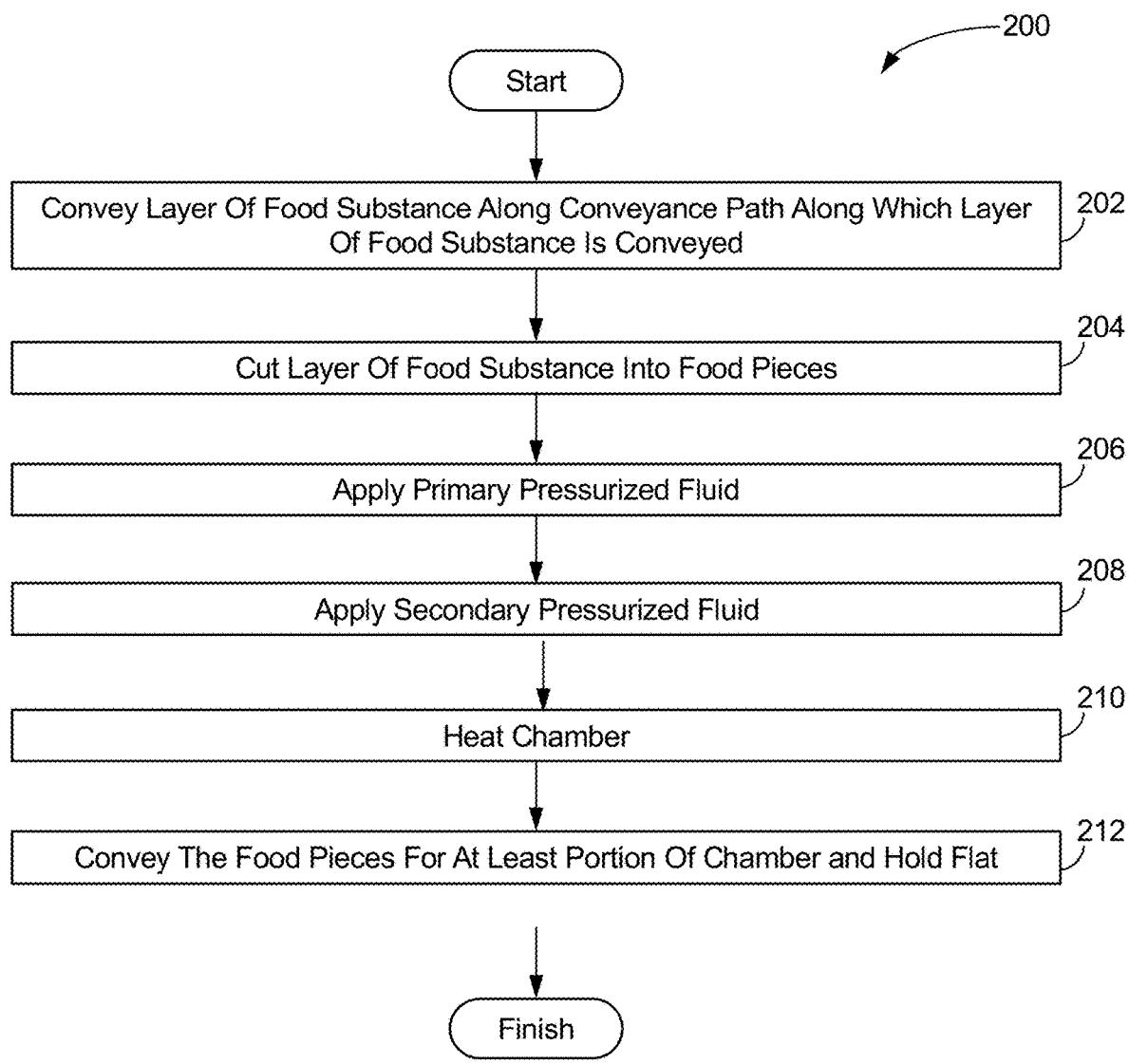
FIG. 2 illustrates a method for cutting and cooking a substance, in accordance with one or more implementations.

FIG. 2 illustrates a method 200 for cutting and cooking a substance, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include conveying a layer of food substance along a conveyance path along which the layer of food substance is conveyed. A cooker and a secondary conveying subsystem may be positioned along the conveyance path. The cooker may include a heating mechanism and a chamber. Operation 202 may be performed by a component that is the same as or similar to primary conveying subsystem 102, in accordance with one or more implementations.

An operation 204 may include cutting the layer of food substance into food pieces. Operation 204 may be performed by a component that is the same as or similar to cutter 108, in accordance with one or more implementations.

An operation 206 may include applying primary pressurized fluid. A primary pressurized fluid outlet may be positioned such that the primary pressurized fluid exiting the primary pressurized fluid outlet applies a force to the food pieces such that the food pieces are released from the cutter. Operation 206 may be performed by a component that is the same as or similar to primary pressurized fluid outlet 110a, in accordance with one or more implementations.

An operation 208 may include applying secondary pressurized fluid. A secondary pressurized fluid outlet may be positioned above the primary conveying substrate and pointed toward the primary conveying substrate. The secondary pressurized fluid exiting the secondary pressurized fluid outlet may apply force to the food pieces to hold the food pieces flat to the primary conveying substrate during conveyance along the conveyance path towards the chamber. Operation 208 may be performed by a component that is the same as or similar to secondary pressurized fluid outlet 110b, in accordance with one or more implementations.

An operation 210 may include heating the chamber. Heating the chamber may heat, dehydrate, and/or cook the layer of food substance. Operation 210 may be performed by a component that is the same as or similar to cooker 104 and/or heating mechanism 120, in accordance with one or more implementations.

An operation 212 may include conveying the food pieces for at least a portion of the chamber. Secondary conveying substrate may be positioned adjacent to the primary conveying substrate to contact the food pieces on a side of the food pieces opposite the primary conveying substrate within the chamber so that the food pieces are held flat between the primary conveying substrate and the secondary conveying substrate. Operation 212 may be performed by a component that is the same as or similar to the primary conveying subsystem 102 and/or secondary conveying subsystem 106, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to cut and cook a raw pork skin, the system comprising:

a cooker, the cooker including an oven with a heating mechanism and a chamber containing air, the heating mechanism heating the air within the chamber to provide an environment suitable for dehydrating pieces of raw pork skin passing through the chamber;

a primary conveying subsystem, the primary conveying subsystem being configured to convey pork skin along a conveyance path, the primary subsystem including a primary conveying substrate and primary driving components, the primary conveying substrate forming a surface on which the pork skin is carried, and the primary driving components moving the primary conveying substrate along the conveyance path;

a cutter, the cutter positioned upstream on the conveyance path from the chamber, the cutter being configured to cut the raw pork skin into raw pork skin pieces;

a primary pressurized fluid outlet, the primary pressurized fluid outlet being positioned so that primary pressurized fluid exiting the primary pressurized fluid outlet applies a force to the raw pork skin pieces to release the raw pork skin pieces from the cutter;

a secondary pressurized fluid outlet, the secondary pressurized fluid outlet being positioned above the primary conveying substrate and pointed toward the primary conveying substrate so that immediately subsequent to cutting the raw pork skin into raw pork skin pieces secondary pressurized fluid exiting the secondary pressurized fluid outlet applies force to the raw pork skin pieces to hold the raw pork skin pieces flat to the primary conveying substrate during conveyance along the conveyance path towards the chamber;

a suction inlet configured to immediately subsequent to cutting the raw pork skin into raw pork skin pieces, apply suction to the raw pork skin pieces to hold the raw pork skin pieces flat to the primary conveying substrate during conveyance along the conveyance path towards the chamber, the suction inlet being positioned below the primary conveying substrate and pointed upward; and a secondary conveying subsystem that includes a secondary conveying substrate and secondary driving components, the secondary conveying substrate being positioned adjacent to the primary conveying substrate to contact the raw pork skin pieces on a side of the raw pork skin pieces opposite the primary conveying substrate within the chamber subsequent to being held flat by the secondary pressurized fluid and the suction such that the raw pork skin pieces are held flat by the secondary pressurized fluid and the suction until contact with the secondary conveying substrate and subsequently held flat between the primary conveying substrate and the secondary conveying substrate for at least a portion of the conveyance path through the chamber to maintain a flatness of the raw pork skin pieces between the first conveying subsystem and the second subsystem during dehydration by the cooker as the raw pork skin pieces pass through the chamber between the first conveying subsystem and the second subsystem such that the raw pork skin pieces become dehydrated pork skin pieces.

2. The system of claim 1, wherein the secondary driving components move the secondary conveying substrate in accordance with the primary conveying substrate along the conveyance path within the chamber.

3. The system of claim 1, wherein the chamber includes an entrance and an exit and wherein the secondary conveying subsystem spans from the entrance of the chamber to the exit of the chamber.

4. The system of claim 1, wherein the cutter includes blades, wherein the blades are arranged in a pattern on the exterior of the cutter.

5. The system of claim 4, wherein the cutter is held by an axis rod around which the cutter rotates, wherein the cutter rotates as the primary conveying substrate carrying the raw pork skin is conveyed underneath the cutter.

6. The system of claim 4, wherein the blades are arranged in the pattern based on a predetermined size of the dehydrated pork skin pieces subsequent to exiting the chamber and the size of the cutter.

7. The system of claim 1, wherein the conveyance path ends at a container into which the dehydrated pork skin pieces are conveyed.

8. A method for cutting and cooking a raw pork skin, the method comprising:

conveying, via a primary conveying subsystem, a pork skin along a conveyance path, the primary conveying subsystem including a primary conveying substrate and primary driving components, the primary conveying substrate forming a surface on which the pork skin is carried, and the primary driving components moving the primary conveying substrate along the conveyance path, wherein a cooker and a secondary conveying subsystem are positioned along the conveyance path, the cooker including an oven with a heating mechanism and a chamber containing air, the heating mechanism heating the air within the chamber to provide an environment suitable for dehydrating pieces of the raw pork skin passing through the chamber, the secondary conveying subsystem including a secondary conveying substrate and secondary driving components, wherein a cutter is positioned upstream on the conveyance path from the chamber;

cutting, via the cutter, the raw pork skin into raw pork skin pieces;

applying, via a primary pressurized fluid outlet, primary pressurized fluid, the primary pressurized fluid outlet being positioned so that primary pressurized fluid exiting the primary pressurized fluid outlet applies a force to the raw pork skin pieces such that the raw pork skin pieces are released from the cutter;

applying, via a secondary pressurized fluid outlet, secondary pressurized fluid, the secondary pressurized fluid outlet being positioned above the primary conveying substrate and pointed toward the primary conveying substrate so that immediately subsequent to cutting the raw pork skin into the raw pork skin pieces the secondary pressurized fluid exiting the secondary pressurized fluid outlet applies force to the raw pork skin pieces to hold the raw pork skin pieces flat to the primary conveying substrate during conveyance along the conveyance path towards the chamber;

applying, via a suction inlet and immediately subsequent to cutting the raw pork skin into raw pork skin pieces, suction to the raw pork skin pieces to hold the raw pork skin pieces flat to the primary conveying substrate during conveyance along the conveyance path towards the chamber, the suction inlet being positioned below the primary conveying substrate and pointed upward, the secondary conveying substrate being positioned adjacent to the primary conveying substrate to contact the raw pork skin pieces on a side of the raw pork skin pieces opposite the primary conveying substrate within the chamber subsequent to being held flat by the secondary pressurized fluid and the suction such that the raw pork skin pieces are held flat by the secondary pressurized fluid and the suction until contact with the secondary conveying substrate and subsequently held flat between the primary conveying substrate and the secondary conveying substrate for at least a portion of the conveyance path through the chamber to maintain a flatness of the raw pork skin pieces between the first conveying subsystem and the second subsystem during dehydration by the cooker as the raw pork skin pieces pass through the chamber between the first conveying subsystem and the second subsystem such that the raw pork skin pieces become dehydrated pork skin pieces.

9. The method of claim 8, wherein the secondary driving components move the secondary conveying substrate in accordance with the primary conveying substrate along the conveyance path within the chamber.

10. The method of claim 8, wherein the chamber includes an entrance and an exit and wherein the secondary conveying subsystem spans from the entrance of the chamber to the exit of the chamber.

11. The method of claim 8, wherein the cutter includes blades, wherein the blades are arranged in a pattern on the exterior of the cutter.

12. The method of claim 11, wherein the cutter is held by an axis rod around which the cutter rotates, wherein the cutter rotates as the primary conveying substrate carrying the raw pork skin is conveyed underneath the cutter.

13. The method of claim 11, wherein the blades are arranged in the pattern based on a predetermined size of the dehydrated pork skin pieces subsequent to conveyance through the chamber and the size of the cutter.

14. The method of claim 8, wherein the conveyance path ends at a container into which the dehydrated pork skin pieces are conveyed.

\* \* \* \* \*